(No Model.)

M. BAILEY & J. WARNER.
PRIMARY BATTERY.

No. 371,244. Patented Oct. 11, 1887.

Witnesses
James Edward Currie
Conrad Henry Marks

Inventors
Mark Bailey & John Warner
per Francis M. Rogers
Attorney

UNITED STATES PATENT OFFICE.

MARK BAILEY AND JOHN WARNER, OF LONDON, ENGLAND.

PRIMARY BATTERY.

SPECIFICATION forming part of Letters Patent No. 371,244, dated October 11, 1887.

Application filed December 29, 1886. Serial No. 222,925. (No model.)

*To all whom it may concern:*

Be it known that we, MARK BAILEY and JOHN WARNER, subjects of the Queen of Great Britain, residing, respectively, at Nothe's Lodge, Wood Green, London, N., and 21 Osborn Street, Whitechapel, London, England, have invented certain new and useful Improvements in Primary Batteries; and we do hereby declare the following to be a full, clear, and exact description of the invention, such as will enable others skilled in the art to which it appertains to make and use the same.

Figure 1:
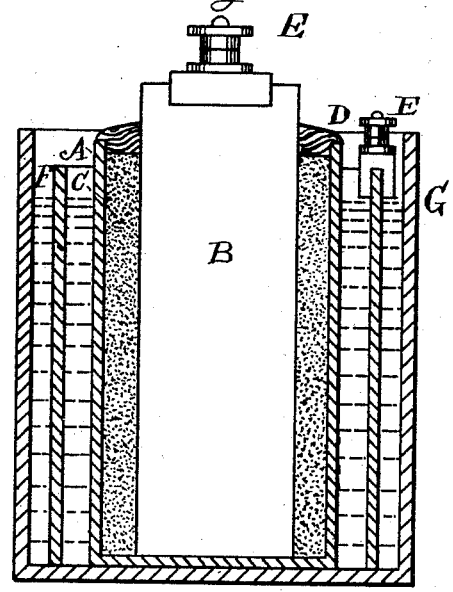
Figure 2:
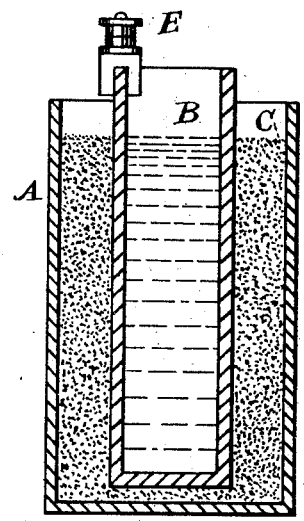
Figure 3:
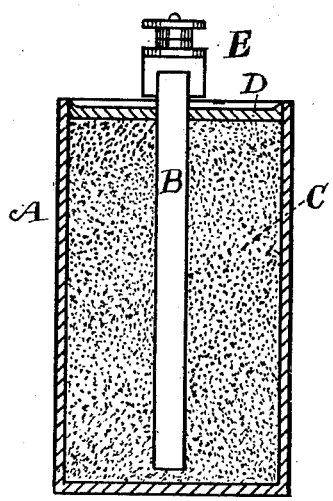
Figure 4:
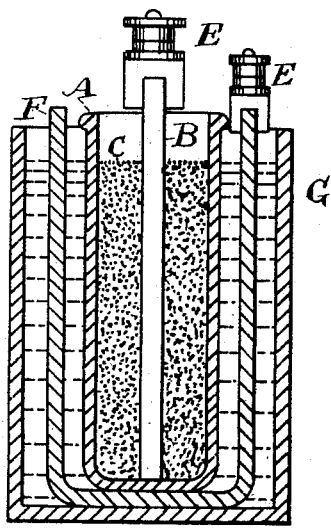

In the accompanying drawings, Figure 1 represents a sectional elevation of our improved cell; Fig. 2, a sectional elevation of a porous carbon tube in a porous pot; Fig. 3, a sectional elevation showing the cover of porous cell replaced by pitch, paraffine, or oil; Fig. 4, a sectional rectangular cell, showing position of zinc element.

In Figs. 1, 2, 3, 4, A is the porous pot; B, the stick, rod, or tube of carbon placed in the mixture of plumbago, nitric acid, and sulphuric acid C within porous pot A; D, a lid or cover (shown in Fig. 3) replaced by pitch, paraffine, or oil; E, the finding-screw, preferably made of aluminium or an alloy of that metal; F, Figs. 1 and 4, the other element, zinc, bent round the circular porous pot A in Fig. 1, but wrapped under the same in Fig. 4.

G is the outer cell containing the zinc element F and porous pot A, the space between porous pot A and wall of outer cell being filled with plain water.

Our invention consists in improvements in primary batteries, its especial feature being the provision of a cell of porous nature ready charged with the materials for the development of a current of considerable energy.

We carry our invention into effect as follows: Natural plumbago of a fairly pure character is reduced to a fine state of division and thoroughly mixed with a mixture of nitric acid and sulphuric acid, about half a pound of each acid being used to one pound of plumbago. The paste formed is placed in a porous pot of suitable electrical resistance for the required purpose. For electric lighting, we employ a pot of low electrical resistance; but for prolonged working, when only a small current is required, we employ a cell of higher electrical resistance. Into the paste we insert a stick of carbon which terminates in a binding-screw, preferably made of aluminium or of an alloy of that metal. The top of the porous pot is covered with a suitable lid or cover, or with paraffine, oil, wax, or other substance of a nature permitting the easy removal of the contents. Sometimes we make the carbon stick or rod in the form of a porous tube, which we fill with a mixture of nitric acid and sulphuric acid. The tube is closed or stopped at its lower end and is placed in the center of the pot containing the paste described. By this means the full energy of the cell can be prolonged or maintained for a considerable time without removing the porous pot, a little fresh acid being added to the tube as may be required. The other element employed is zinc, which may be amalgamated or not. We prefer to bend the zinc plate round the porous pot; but if the porous pot be of rectangular shape it can be wrapped round or under it in the manner well understood. The zinc plate and the porous pot, or the porous pot fitted with internal tube, as described, are placed in an outer stoneware, glass, or other suitable jar, trough, or vessel, which is then filled up with water. Upon closing the circuit a very powerful current is produced and maintained for a lengthened period.

By means of our invention the mess and trouble consequent upon emptying the spent charges, washing, and reamalgamating the zinc plates is avoided. As the internal cell contains the exciting and depolarizing materials, the spent cell is replaced with one freshly charged; or, if the hollow carbon tube be employed, it is refilled with a mixture of nitric and sulphuric acid, as already described, plain water being added to the outer cell from time to time to replace that lost by evaporation.

Having now described our invention, what we desire to secure by Letters Patent is—

1. In a primary-battery cell, the combination of a porous pot and a mixture of plumbago, nitric acid, and sulphuric acid contained therein, with a carbon element embedded in said mixture, and a removable cover, substantially as set forth.

2. A composition of matter for batteries, consisting of a mixture of plumbago, nitric acid, and sulphuric acid, substantially as set forth.

3. The combination of carbon and zinc elements with a mixture of plumbago, nitric acid, and sulphuric acid, substantially as set forth.

In testimony whereof we affix our signatures in presence of two witnesses.

MARK BAILEY.
JOHN WARNER.

Witnesses:
JNO. BOULLON,
WM. CRAWLEY,
Clerks to Messrs. Grain & Sons, Notaries, 46 Lomband Street, London, England.